(12) United States Patent
Nakamura et al.

(10) Patent No.: US 9,086,607 B2
(45) Date of Patent: Jul. 21, 2015

(54) ELECTROPHORETIC DISPLAY AND ELECTRONIC DEVICE

(71) Applicant: SEIKO EPSON CORPORATION, Tokyo (JP)

(72) Inventors: Kazuya Nakamura, Tatsuno-machi (JP); Katsunori Yamazaki, Matsumoto (JP); Kenji Hayashi, Ageo (JP); Saichi Hirabayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 141 days.

(21) Appl. No.: 13/873,770

(22) Filed: Apr. 30, 2013

(65) Prior Publication Data

US 2013/0301112 A1 Nov. 14, 2013

(30) Foreign Application Priority Data

May 8, 2012 (JP) .................................. 2012-106689

(51) Int. Cl.
*G02B 26/00* (2006.01)
*G02F 1/167* (2006.01)

(52) U.S. Cl.
CPC ........ *G02F 1/167* (2013.01); *G02F 2001/1672* (2013.01)

(58) Field of Classification Search
USPC ............. 359/296; 345/107; 430/32; 204/600; 505/472; 526/934
See application file for complete search history.

(56) References Cited

U.S. PATENT DOCUMENTS

2010/0232010 A1* 9/2010 Song .............................. 359/296
2013/0038921 A1* 2/2013 Kim et al. ..................... 359/296

FOREIGN PATENT DOCUMENTS

JP    A-2006-039106    2/2006

* cited by examiner

*Primary Examiner* — Scott J Sugarman
*Assistant Examiner* — Alberto Betancourt
(74) *Attorney, Agent, or Firm* — Oliff PLC

(57) ABSTRACT

An electrophoretic display includes an electrophoretic layer arranged in each pixel region partitioned by a partition member disposed between a first electrode and a second electrode that are arranged on the inner sides of a pair of substrates. The partition member has bottom portions laminated on the first electrode and partition walls joined to the bottom portions. The partition walls partition the pixel region. The bottom portions each have a protrusion.

10 Claims, 5 Drawing Sheets

ELECTROPHORETIC DISPLAY AND ELECTRONIC DEVICE

BACKGROUND

1. Technical Field

The present invention relates to an electrophoretic display and an electronic device.

2. Related Art

In an electrophoretic display, an electrophoretic layer containing a dispersion medium and electrophoretic particles is disposed between electrodes formed on the inner sides of a pair of substrates. Such an electrophoretic display can display desired information by controlling, for example, the amplitude, polarity, waveform, application time, and frequency of the voltage applied between the electrodes.

In a known method of producing the electrophoretic display, a partition member for arranging electrophoretic layers is formed by an imprint method (see, for example, JP-A-2006-39106). In the imprint method, a residue is formed on the bottom face of the partition member. The formation of such a residue may prevent sufficient application of a voltage to an electro-optical layer and thereby reduce the reliability of the product. Accordingly, in JP-A-2006-39106, the residual portion is removed by dry etching.

However, the dry etching is performed in vacuum and is therefore complicated, and such a treatment leads to an increase in number of steps. The dry etching also has a problem of damaging the partition member itself in removal of the residual portion.

SUMMARY

An advantage of some aspects of the invention is that even if an electrophoretic display or an electronic device has a partition member, satisfactory display characteristics can be provided.

The electrophoretic display of the invention includes an electrophoretic layer arranged in each of pixel regions partitioned by a partition member disposed between a first electrode and a second electrode that are arranged on the inner sides of a pair of substrates. The partition member has bottom portions laminated on the first electrode and partition walls joined to the bottom portions. The partition walls partition the pixel regions. The bottom portions each have a protrusion.

For example, in formation of the partition member by an imprint method using a metal mold having concavities at positions corresponding to the respective bottom portions, the excess partition member-forming material that constitutes each bottom portion flows into the concavity. On this occasion, a protrusion is formed on the bottom portion, and the region of the bottom portion other than the protrusion has a small thickness.

As a result, the electrophoretic display of the invention is provided with a partition member having bottom portions each having a protrusion. The bottom portions each have a small thickness at the region other than the protrusion. It is therefore possible to apply a sufficient voltage to the electro-optical layer arranged in each pixel region partitioned by the partition member. As a result, an electro-optical device having high reliability that can achieve satisfactory display characteristics is provided.

The protrusion may be disposed at a position separated from the partition wall.

In such a configuration having a protrusion at a position separated from the partition walls, the movement of electrophoretic particles constituting the electrophoretic layer in each pixel region is prevented from being obstructed, compared to a configuration in which a protrusion is disposed so as to be in contact with the partition wall.

The protrusion may be disposed at the center of the bottom portion.

Such a configuration having a protrusion at the center of the bottom portion allows an electric field to successfully pass over the protrusion. The electrophoretic particles can satisfactorily move in the pixel region to achieve high display characteristics.

The protrusion can have a size being 30% or less of the distance between partition walls partitioning the pixel region in a planar view.

Such a configuration in which the size of the protrusion is restricted to be 30% or less of the distance between the partition walls can prevent occurrence of a defect where the protrusion obstructs the movement of the electrophoretic particles in the pixel region.

The first electrode may be arranged in such a manner that two or more of the first electrodes cover one pixel region, and the protrusion may be arranged so as to overlap corner portions of the first electrodes in a planar view in the pixel region.

Such a configuration can reduce the overlapping region in a planar of the protrusion view and each pixel electrode and therefore allows successful application of an electric field to the electrophoretic particles in each pixel region even if two or more first electrodes cover one pixel region.

The electronic device of the invention includes the electrophoretic display described above.

In the electronic device of the invention including the above-described electrophoretic display, the electronic device itself also can have high reliability that can achieve satisfactory display characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
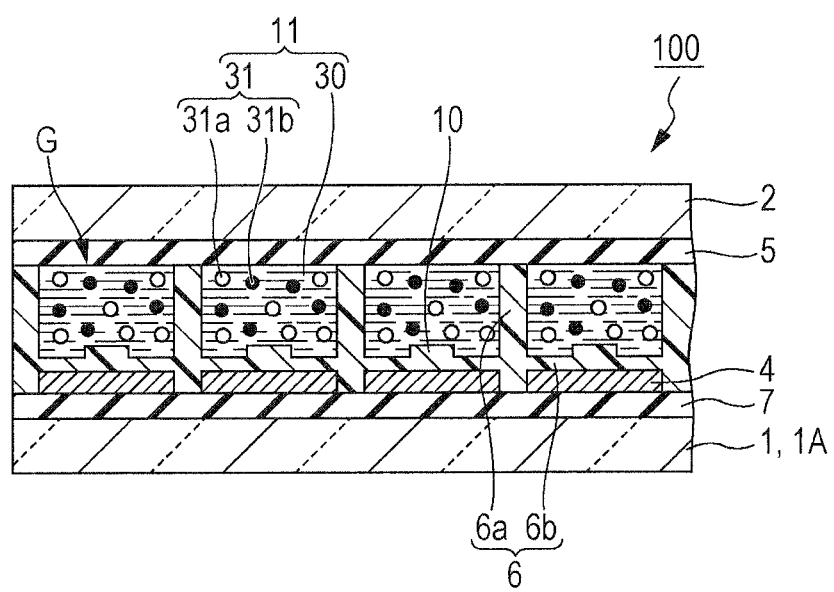
FIG. 1 is a cross-sectional view schematically illustrating the configuration of an electrophoretic display according to an embodiment.

Embodiments of the invention will now be described with reference to the drawings. In each drawing, the scales of members are different in order to make the members large enough to be recognizable in the drawings.

FIG. 1 is a cross-sectional view schematically illustrating the configuration of an electrophoretic display according to this embodiment. As shown in FIG. 1, the electrophoretic display 100 includes an element substrate 1, a counter substrate 2, and electrophoretic layers 11 arranged between the element substrate 1 and the counter substrate 2. The electrophoretic layers 11 are each arranged between a pixel electrode (first electrode) 4 disposed on the inner side of the element substrate 1 and a common electrode (second electrode) 5 disposed on the inner side of the counter substrate 2.

The pixel electrodes 4 are aligned on an insulating film 7 formed on the electrophoretic layer 11 side of a base material 1A serving as the element substrate 1.

The base material 1A is made of, for example, glass or plastic, and is arranged on the opposite side to the picture displaying face. Therefore, the base material 1A may not be transparent. The pixel electrodes 4 are, for example, formed by laminating a nickel plate and a gold plate in this order on copper (Cu) foil or made of aluminum (Al), an indium tin oxide (ITO), or the like. Between the pixel electrodes 4 and the element substrate 1, scanning lines, data lines, selection transistors, etc. (not shown) are disposed.

The counter substrate 2 is made of, for example, glass or plastic, and is arranged on the picture displaying side. Therefore, the counter substrate 2 should be a transparent substrate. The common electrode 5 in a planar shape is disposed on the electrophoretic layer 11 side of the counter substrate 2 so as to oppose to the pixel electrodes 4. The electrophoretic layers 11 are disposed on the common electrode 5. The common electrode 5 is a transparent electrode formed of MgAg, ITO, an indium zinc oxide (IZO), or the like.

The pixel electrodes 4 on the element substrate 1 are covered with a partition member 6. The partition member 6 partitions pixels G that are disposed so as to correspond to the respective pixel electrodes 4. The partition member 6 includes partition walls 6a partitioning adjacent pixels G and bottom portions 6b connected to the partition walls 6a.

The material of the partition member 6 is, for example, an acrylic resin or an epoxy resin. The partition member 6 is formed by forming a resin layer so as to cover the pixel electrodes 4 and then imprinting the resin layer as described below.

Figure 2A:
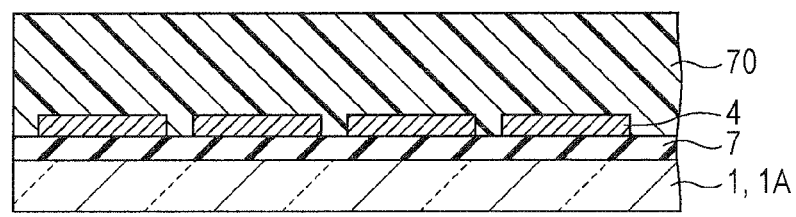
FIGS. 2A to 2C are diagrams for explaining a process of producing an electrophoretic display.
Figure 2B:
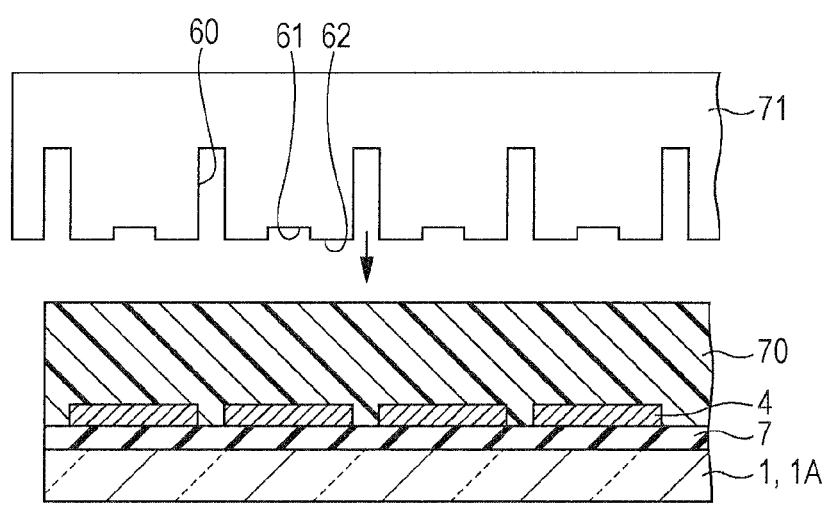
Figure 2C:
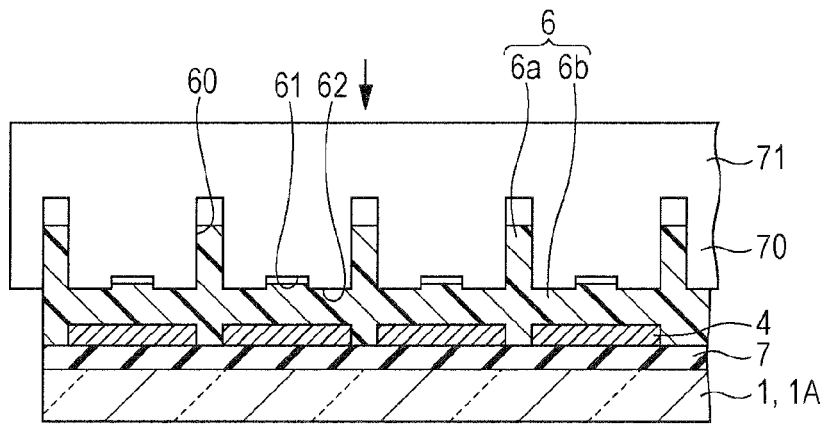

In the imprint method, a male mold having a concavo-convex shape corresponding to the size of the pixel G is pressed to the resin layer to form the partition walls 6a and the bottom portions (boundary layers) 6b of the partition member 6 (see FIGS. 2A to 2C). That is, the bottom portions 6b are constituted of the residue formed in the process of imprinting the resin layer. Herein, the term "residue" refers to the resin portion remaining between the male mold and the element substrate 1 when the male mold is pressed to the resin layer.

The electrophoretic layers 11 are each composed of a dispersion medium 30 and electrophoretic particles 31 dispersed in the dispersion medium 30. The electrophoretic particles 31 include, for example, white particles 31a and black particles 31b.

Examples of the dispersion medium 30 include water, alcohol solvents (e.g., methanol, ethanol, isopropanol, butanol, octanol, and methyl cellosolve), esters (e.g., ethyl acetate and butyl acetate), ketones (e.g., acetone, methyl ethyl ketone, and methyl isobutyl ketone), aliphatic hydrocarbons (e.g., pentane, hexane, and octane), alicyclic hydrocarbons (e.g., cyclohexane and methylcyclohexane), aromatic hydrocarbons (e.g., benzene, toluene, xylene, and benzenes having long-chain alkyl groups (e.g., hexyl benzene, heptyl benzene, octyl benzene, nonyl benzene, decyl benzene, undecyl benzene, dodecyl benzene, tridecyl benzene, and tetradecyl benzene)), halogenated hydrocarbons (e.g., methylene chloride, chloroform, carbon tetrachloride, and 1,2-dichloroethane), and other oils. These materials may be used alone or as a mixture or may be mixed with a surfactant such as carboxylates.

The white particles 31a are, for example, negatively charged white pigment particles (polymer or colloid) such as titanium dioxide, zinc flower, or antimony trioxide. The black particles 31b are, for example, positively charged black pigment particles (polymer or colloid) such as aniline black or carbon black. These pigment particles may be dispersed together with particles of a charge-controlling agent such as an electrolyte, surfactant, metal soap, resin, rubber, oil, varnish, or compound; a dispersing agent such as a titanium coupling agent, an aluminum coupling agent, or a silane coupling agent; a lubricant; or a stabilizer, as needed.

Alternatively, for example, red, green, and blue pigments may be used instead of the white particles 31a and the black particles 31b. Such a configuration can provide an electrophoretic display 100 that can perform color display through displaying of red, green, blue, etc.

The electrophoretic display 100 performs white display by maintaining the potential of the common electrode 5 at a relatively high level and maintaining the potential of the pixel electrode 4 at a relatively low level. This results in that the negatively charged white particles 31a are attracted to the common electrode 5 and that the positively charged black particles 31b are attracted to the pixel electrode 4. As a result, when this pixel G is viewed from the display face side, i.e., from the counter substrate 2 side, a white display is recognized. The electrophoretic display 100 can thus perform white display.

Alternatively, the electrophoretic display 100 performs black display by maintaining the potential of the common electrode 5 at a relatively low level and maintaining the potential of the pixel electrode 4 at a relatively high level. This results in that the positively charged black particles 31b are attracted to the common electrode 5 and that the negatively charged white particles 31a are attracted to the pixel electrode 4. As a result, when this pixel G is viewed from the display face side, i.e., from the counter substrate 2 side, a black display is recognized. The electrophoretic display 100 can thus perform black display.

In the electrophoretic display 100 having such a configuration, the electrophoretic particles 31 (white particles 31a or black particles 31b) in the electrophoretic layer 11 of each pixel G are moved to the counter substrate 2 side by applying a predetermined voltage between pixel electrode 4 and common electrode 5 in the pixel G to allow black or white display in each pixel G. The electrophoretic display 100 can display a desired image as a whole.

The electrophoretic display 100 according to this embodiment includes a layer, i.e., the bottom portion 6b of the partition member 6, between the pixel electrode 4 and the electrophoretic layer 11. In such a configuration, the bottom portion 6b prevents a sufficient voltage from being applied to the electrophoretic layer 11, which prevention may disturb the movement of the electrophoretic particles 31 in the electrophoretic layer 11 and may disturb the achievement of desired display characteristics.

As a countermeasure against such prevention, the electrophoretic display 100 according to this embodiment has bottom portions 6b each provided with a protrusion 10. The bottom portion 6b having the protrusion 10 can reduce the thickness at the region where the protrusion 10 is not formed.

The protrusion 10 according to this embodiment has a shape of approximately a quadrilateral (square) in a planar view (when the electrophoretic display 100 is viewed from a direction orthogonal to the counter substrate 2).

Herein, if the protrusion 10 is disposed at a position connected to the partition wall 6a, an electric field cannot be satisfactorily applied to the electrophoretic layer 11 in the pixel G, which application may prevent the movement of the electrophoretic particles 31 and thereby may reduce the display characteristics. As a countermeasure to this, in this embodiment, the protrusion 10 is disposed at a position separated from the partition wall 6a of the partition member 6. Specifically, in this embodiment, the protrusion 10 is disposed at the center of the bottom portion 6b.

The protrusion 10 has a large thickness compared to the region of the bottom portion 6b other than the protrusion 10. Therefore, the protrusion 10 inhibits the electric field applied to the electrophoretic layer 11 in the direction passing through the protrusion 10. As a countermeasure to this, in this embodiment, as described above, the protrusion 10 is disposed at the center of the bottom portion 6b. Consequently, the electric field applied between the pixel electrode 4 and the common electrode 5 can successfully pass over the protrusion 10. Accordingly, an electric field can be applied to the electrophoretic layer 11 arranged on the protrusion 10, and visibility of each G is ensured.

In a planar view (when the electrophoretic display 100 is viewed from a direction orthogonal to the counter substrate 2), the size (the length of one side of a square) of the protrusion 10 is 30% or less of the opening diameter of the pixel G, i.e., 30% or less of the distance between partition walls 6a partitioning the pixel G. Herein, the term "the size of a protrusion 10" refers to the maximum horizontal cross-section of the protrusion 10.

If the size of the protrusion 10 is too large, the protrusion 10 may inhibit the electric field applied to the electrophoretic layer 11. However, the degree of inhibition of the electric field by the protrusion 10 can be suppressed by controlling the size of the protrusion 10 to the above mentioned range.

A method of producing the electrophoretic display 100 according to this embodiment will now be described. FIGS. 2A to 2C, 3A, and 3B are diagrams explaining the process of producing the electrophoretic display 100.

First, as shown in FIG. 2A, a partition-forming material 70 for forming a partition member 6 is disposed on an element substrate 1 having a plurality of pixel electrodes 4 by a known method. Examples of the partition-forming material 70 include acrylic resins and epoxy resins. The arrangement of the partition-forming material 70 can be performed by, for example, application using a dispenser or an ink jet head.

Next, as shown in FIG. 2B, a mold member 71 for imprinting is pressed to the partition-forming material 70. The mold member 71 has concavities 60 corresponding to the partition walls 6a, convexities 62 corresponding to the bottom portions 6b, and concavities 61 corresponding to the protrusions 10. As shown in FIG. 2C, the partition walls 6a and the bottom portions 6b are transferred to the partition-forming material 70 by pressing the mold member 71 to the partition-forming material 70 to form a partition member 6.

The partition-forming material 70 pushed aside by the convexities 62 when the mold member 71 is pressed to the partition-forming material 70 penetrates into the concavities 60 and 61. The partition-forming material 70 penetrated into the concavities 60 forms the partition walls 6a, whereas the partition-forming material 70 penetrated into the concavities 61 forms the protrusions 10.

The volume of the concavity 61 is determined such that the resin penetrated into the concavity 60 can form a partition wall 6a having a predetermined height. This allows the resin to flow into the concavity 60 and thereby prevents occurrence of a defect where the height of partition wall 6a is low.

According to this embodiment, the excess partition-forming material 70 that does not fit into the concavity 60 and is pushed aside by the convexity 62 of the mold member 71 can penetrate into the concavity 61. As a result, the thickness of the partition-forming material 70 remaining between the convexity 62 and the pixel electrode 4, i.e., the thickness of the bottom portion 6b, can be reduced.

Figure 3A:
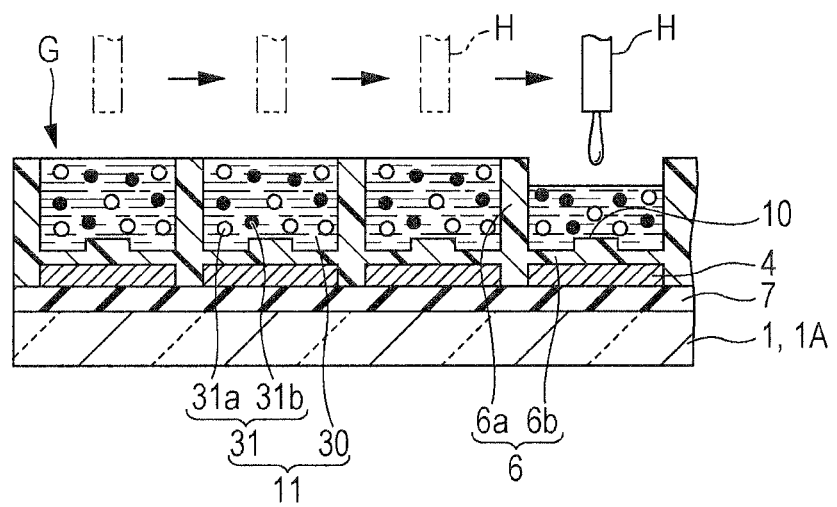
FIGS. 3A and 3B are diagrams, continued from FIG. 2C, for explaining the process of producing an electrophoretic display.

Subsequently, each pixel G partitioned by the partition member 6 is filled with a dispersion of electrophoretic particles by an ink jetting. Specifically, as shown in FIG. 3A, the electrophoretic particle dispersion is discharged into each pixel G partitioned by the partition member 6 from the ink jet head H of an ink jet apparatus to fill the pixel G with a predetermined amount of the electrophoretic particle dispersion for forming an electrophoretic layer 11.

The method of filling the pixels G with the electrophoretic particle dispersion is not limited to the ink jetting, and any method such as spin coating, die coating, slit coating, curtain coating, spray coating, screen printing, flexography, gravure printing, or off-set printing can be employed.

Figure 3B:
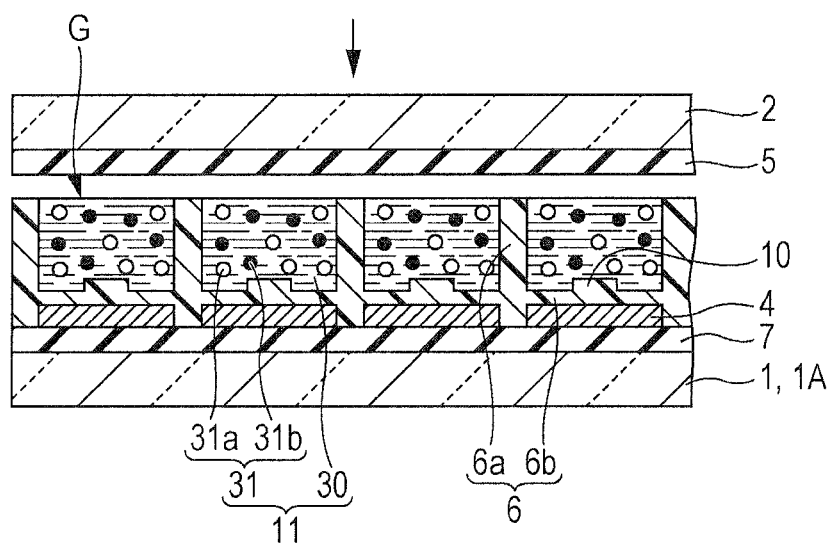

Subsequently, as shown in FIG. 3B, a counter substrate 2 is bonded to the upper portion of the partition member 6 via an adhesive layer (not shown) to seal the electrophoretic layer 11 in each pixel G. The electrophoretic display 100 according to this embodiment can be produced by the process described above.

As described above, in the electrophoretic display 100 according to this embodiment, protrusion 10 is formed at the bottom portion 6b of the partition member 6, and thereby the thickness of the bottom portion 6b can be reduced at the region other than the protrusion 10. This configuration allows a sufficient voltage to be applied to the electrophoretic layer 11 arranged in each pixel G partitioned by the partition member 6. As a result, the electrophoretic display 100 has high reliability that can achieve satisfactory display characteristics.

Figure 4A:
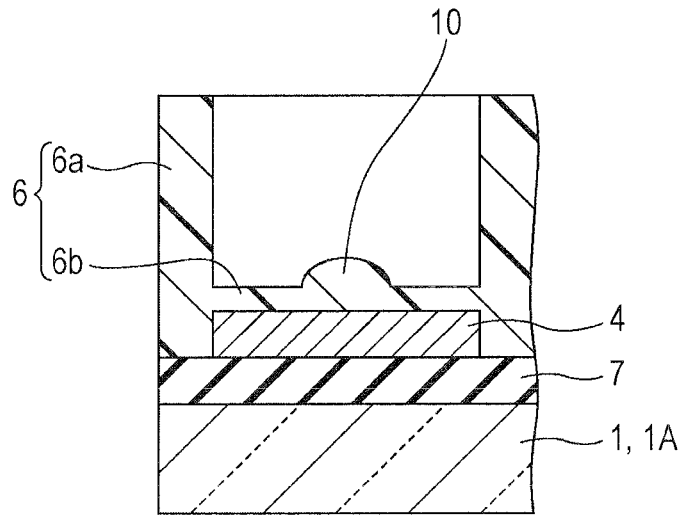
FIGS. 4A and 4B are diagrams illustrating modification examples of the protrusion shape.
Figure 4B:
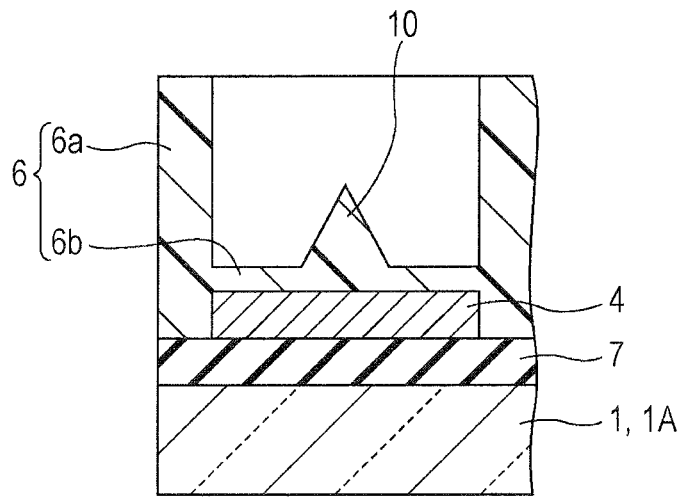

An embodiment of the invention has been described above, but the invention is not limited thereto, and various modifications can be made without departing from the gist of the invention. For example, though the embodiment has shown a protrusion 10 having an approximately square shape in a planar view, the shape of the protrusion 10 is not limited thereto, and any shape, for example, a circle or a polygon such as a hexagon can be employed. The protrusion 10 may have any cross-sectional shape, such as a semi-ellipse as shown in FIG. 4A or a triangle shape as shown in FIG. 4B.

That is, the protrusion 10 can have any shape that can receive the partition-forming material 70 extruded in the imprinting process and thereby reduce the thickness of the bottom portion 6b. The protrusion 10 most preferably has a shape that allows an electric field applied to the electrophoretic layer 11 in the pixel G to easily pass over the protrusion 10.

Figure 5:
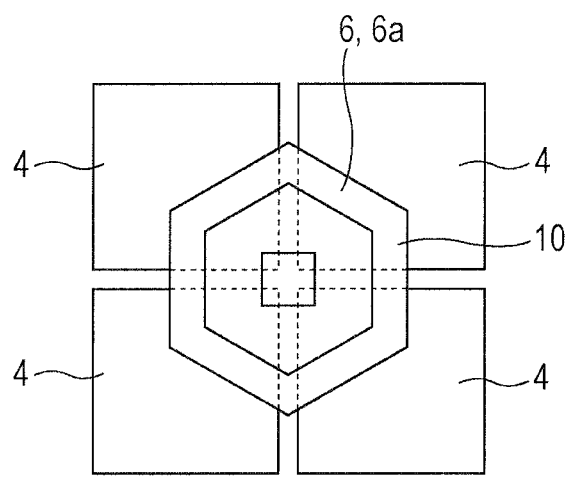
FIG. 5 is a diagram illustrating a relationship in size between a pixel and a pixel electrode in a modification example.

The planar shape of the pixel G, i.e., the planar shape of the region partitioned by the partition member 6, is not limited to quadrilaterals and may be a polygon such as a hexagon as shown in FIG. 5. Though the embodiment above has shown a case in which one pixel electrode 4 is arranged in each pixel G, a plurality of pixel electrodes 4 (e.g., four pixel electrodes) may be arranged for one pixel G as shown in FIG. 5.

In such a configuration, a protrusion 10 is preferably arranged so as to overlap the corner portions of a plurality of pixel electrodes 4 in a planar view. This configuration can reduce the overlapping region between the protrusion 10 and each pixel electrode 4 in a planar view and therefore allows successful application of an electric field to the electrophoretic particles 31 in each pixel G to achieve satisfactory display characteristics.

Electronic Device

Application of the electrophoretic display of each embodiment described above to an electronic device will now be described.

Figure 6A:
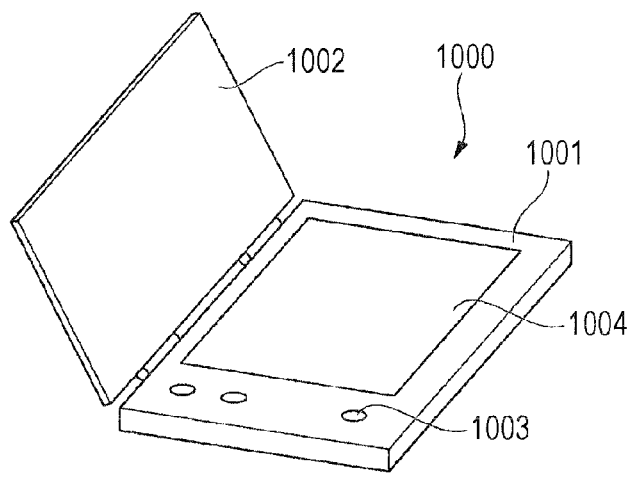
FIGS. 6A to 6C show specific examples of the electronic device to which the electrophoretic display of the invention is applied.
Figure 6B:
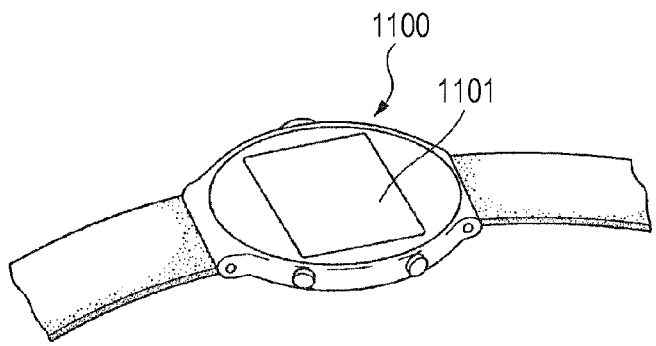
Figure 6C:
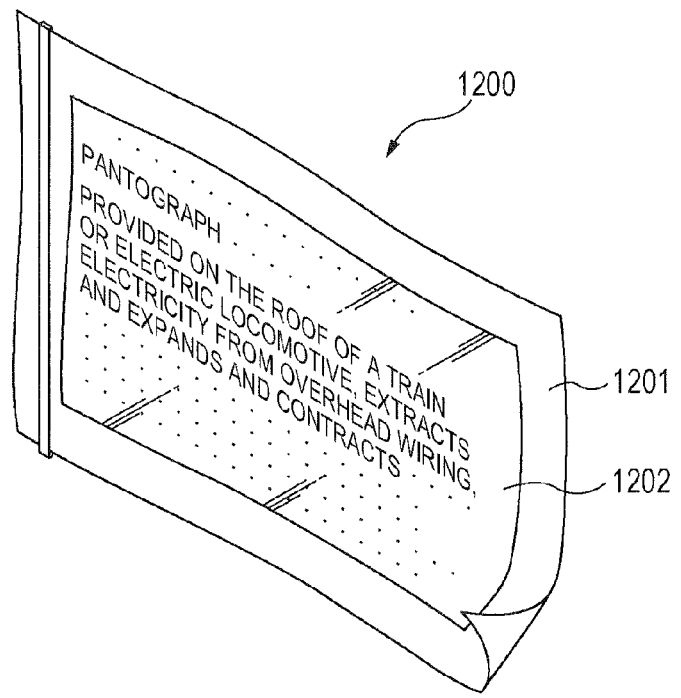

FIGS. 6A to 6C are perspective views illustrating specific examples of the electronic device to which the electrophoretic display of the invention is applied.

FIG. 6A is a perspective view illustrating an electronic book as an example of the electronic device. This electronic book (electronic device) 1000 includes a book-shaped frame 1001, a (openable and closable) cover 1002 rotatably disposed to the frame 1001, an operating portion 1003, and a display 1004 constituted of the electrophoretic display of the invention.

FIG. 6B is a perspective view illustrating a wristwatch as an example of the electronic device. This wristwatch (electronic device) 1100 includes a display 1101 constituted of the electrophoretic display of the invention.

FIG. 6C is a perspective view illustrating electronic paper as an example of the electronic device. This electronic paper (electronic device) 1200 include a body 1201 constituted of a rewritable sheet having texture and flexibility similar to those of paper and a display 1202 constituted of the electrophoretic display of the invention.

For example, the electronic book and the electronic paper are conceived to be used in repeated writing of letters on a white background, and it is necessary to eliminate the ghost image and image retention.

The range of the electronic device to which the electrophoretic display of the invention is applicable is not limited to those mentioned above and encompasses various devices that utilize a change in color tone caused by movement of charged particles.

The above-mentioned electronic book 1000, wristwatch 1100, and electronic paper 1200 each employ the electrophoretic display according to the invention and, thereby, are each a high-quality electronic device having high reliability that can achieve desired display characteristics through successful application of a voltage to the electrophoretic layer.

The electronic devices mentioned above are merely exemplary examples of the electronic device of the invention and do not restrict the technological scope of the invention. For example, the electrophoretic display of the invention can also be suitably applied to displays of electronic devices such as mobile phones and portable audio instruments, sheets for business use such as manuals, textbooks, workbooks, and information sheets.

This application claims the benefit of Japanese Patent Application No. 2012-106689, filed on May 8, 2012, which is hereby incorporated by reference as if fully set forth herein.

What is claimed is:

1. An electrophoretic display comprising:
   a pair of substrates;
   a first electrode and a second electrode arranged on the inner sides of the pair of substrates;
   a partition member formed from one layer and disposed between the first electrode and the second electrode, the partition member having:
      a bottom portion laminated on the first electrode and having a protrusion; and
      partition walls joined to the bottom portion that partition a pixel region; and
   an electrophoretic layer arranged in the pixel region partitioned by the partition member.

2. The electrophoretic display according to claim 1, wherein the protrusion is disposed at a position separated from the partition walls.

3. The electrophoretic display according to claim 2, wherein the protrusion is disposed at the center of the bottom portion.

4. The electrophoretic display according to claim 1, wherein the protrusion has a size being 30% or less of the distance between partition walls partitioning the pixel region in a planar view.

5. The electrophoretic display according to claim 1, wherein
   the first electrode is arranged in such a manner that two or more of the first electrodes cover one pixel region; and
   the protrusion is arranged so as to overlap corner portions of the first electrodes in a planar view.

6. An electronic device comprising the electrophoretic display according to claim 1.

7. An electronic device comprising the electrophoretic display according to claim 2.

8. An electronic device comprising the electrophoretic display according to claim 3.

9. An electronic device comprising the electrophoretic display according to claim 4.

10. An electronic device comprising the electrophoretic display according to claim 5.

* * * * *